(12) United States Patent
Honnecke et al.

(10) Patent No.: US 12,370,481 B1
(45) Date of Patent: Jul. 29, 2025

(54) FILTER CABINET FOR FURNACE SYSTEMS

(71) Applicant: Best Box, LLC, Arvada, CO (US)

(72) Inventors: Von Honnecke, Lakewood, CO (US); Chase J. Honnecke, Denver, CO (US)

( * ) Notice: Subject to any disclaimer, the term of this patent is extended or adjusted under 35 U.S.C. 154(b) by 737 days.

(21) Appl. No.: 17/168,046

(22) Filed: Feb. 4, 2021

Related U.S. Application Data

(63) Continuation-in-part of application No. 16/593,694, filed on Oct. 4, 2019, now abandoned, and a continuation-in-part of application No. 15/870,185, filed on Jan. 12, 2018, now Pat. No. 10,434,448, and a continuation of application No. 15/433,655, filed on Feb. 15, 2017, now abandoned, and a continuation-in-part of application No. 15/074,435, filed on Mar. 18, 2016, now abandoned, and a continuation-in-part of application No. 14/218,638, filed on Mar. 18, 2014, now abandoned.

(51) Int. Cl.
*B01D 46/00* (2022.01)
*F24F 13/28* (2006.01)
*F24H 9/00* (2022.01)

(52) U.S. Cl.
CPC .......... *B01D 46/0006* (2013.01); *F24F 13/28* (2013.01); *F24H 9/0052* (2013.01); *B01D 2279/50* (2013.01)

(58) Field of Classification Search
CPC . B01D 46/0006; B01D 2279/50; F24F 13/28; F24H 9/0052
USPC .......................................................... 55/481
See application file for complete search history.

(56) References Cited

U.S. PATENT DOCUMENTS

| | | | | |
|---|---|---|---|---|
| 2,035,653 | A * | 3/1936 | Haskell | F24F 5/0017 261/153 |
| 4,264,345 | A * | 4/1981 | Miller | B01D 50/20 55/504 |
| 4,517,903 | A * | 5/1985 | Richmond | F23K 3/16 110/118 |
| 4,919,123 | A | 4/1990 | Jackson et al. | |
| 5,599,364 | A * | 2/1997 | Hawkins | B01D 46/88 55/508 |
| 8,999,029 | B1 * | 4/2015 | Brandt | B01D 46/0006 55/484 |
| 9,174,154 | B1 * | 11/2015 | Tang | B01D 46/10 |
| 2002/0020160 | A1 * | 2/2002 | Moore | B01D 46/2411 55/502 |
| 2011/0094198 | A1 * | 4/2011 | Pindell | B01D 46/0004 55/504 |

(Continued)

OTHER PUBLICATIONS http://www.flowrightbox.com/assemblyinstructions.html.

(Continued)

*Primary Examiner* — T. Bennett McKenzie
(74) *Attorney, Agent, or Firm* — Reilly Intellectual Property Law Firm

(57) ABSTRACT

A breakdown cabinet for a furnace filter, the cabinet being made up of a frame support member, a base plate, vertical side and end panels joined together to define a generally rectangular housing having a frame support member, one of the end panels having a door way and an upper door panel mounted in the door way and hinged along its lower edge with spring loaded hinges and pivotal side clip members between the door and sides of the door frame or side panels to securely retain the door in a closed position.

8 Claims, 4 Drawing Sheets

(56) References Cited

U.S. PATENT DOCUMENTS

2015/0075385 A1* 3/2015 Ou .................... B01D 47/06
                                                    96/322
2016/0082380 A1* 3/2016 Seitz .................. B01D 46/58
                                                    95/286

OTHER PUBLICATIONS

Court case No. 1:15 cv 02785 *Brandt et al v. Honnecke and S&H Heating and AC/Sheet Metal* for patent infringement of U.S. Pat. No. 8,999,029.
"S&H Return Air Box Assembly," https://www.youtube.com/watch?v=_IIkIERrNfY.

* cited by examiner

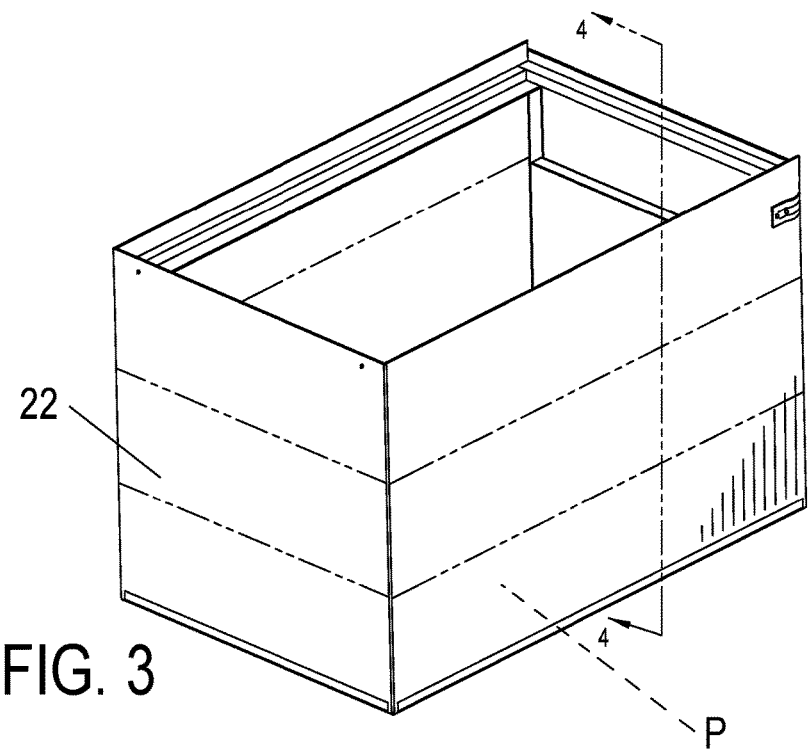
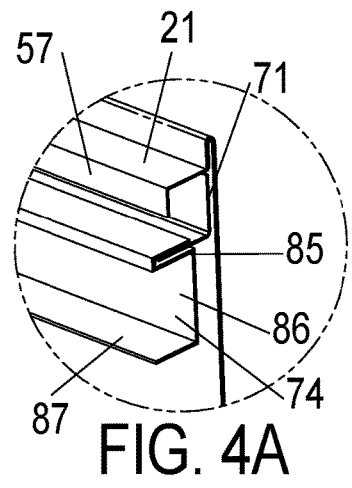
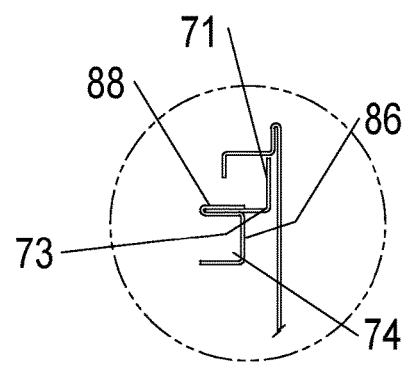
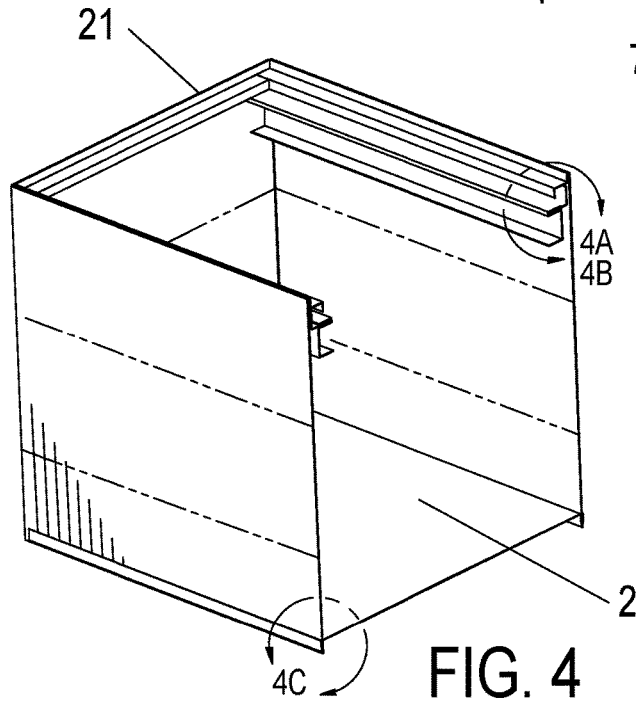
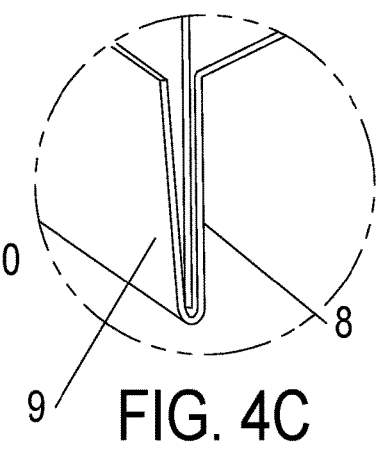

FILTER CABINET FOR FURNACE SYSTEMS

SUMMARY

The following relates to filter cabinets and more particularly relates to a novel and improved filter cabinet to serve as a support and filter housing for forced air furnaces. There is provided an assembly of a filter cabinet for an HVAC or forced air furnace system which is made up of a breakdown furnace filter housing assembly for use as a three-dimensional self-standing structure having a base member, generally rectangular vertical side panels and a pair of opposite, generally rectangular end panels joined to define a generally rectangular housing. The end panels and the side panels joined to the base member having upwardly directed flanges in engagement with the opposite side panels and the end panels, one end panel having a doorway and a door panel mounted in the doorway for movement between an open and closed position with respect to the doorway, wherein the first end panel comprises a sheet material comprising an upper frame member, a lower frame member and side frame members connecting the upper and lower frame members wherein the doorway is formed between the upper, lower and side frame members, a frame support member secured to each of the end panels, a pair of removable guideways mounted on the frame support member, and an open plenum between a horizontal top wall and a top portion of the frame support member. The rectangular side and end panels are mounted on a bottom plate joined to the lower edges of the side and end panels by generally V-shaped clips, the side and end panels being so connected as to be collapsible. The assembly is reinforced and supported with a filter frame insert that provides stability to the upper portion of the filter box preserving the integrity of the upper portion so that it does not buckle or misalign when the box is connected to the furnace.

DETAILED DESCRIPTION OF DRAWINGS

FIG. 3 is a rear perspective view of FIG. 5;

FIG. 4 is a cross-sectional view taken about lines 4-4 of FIG. 3;

FIG. 4A is an enlarged, perspective view of the interconnection between the upright panels and filter supports of the assembly shown in FIG. 4;

FIG. 4B is an enlarged, front view of the interconnection between the bottom edges of the upright panels and base of the assembly shown in FIG. 4;

FIG. 4C is an enlarged, perspective view of the interconnection between the bottom edges of the upright panels and base of the assembly shown in FIG. 4;

DETAILED DESCRIPTION

Figure 1:
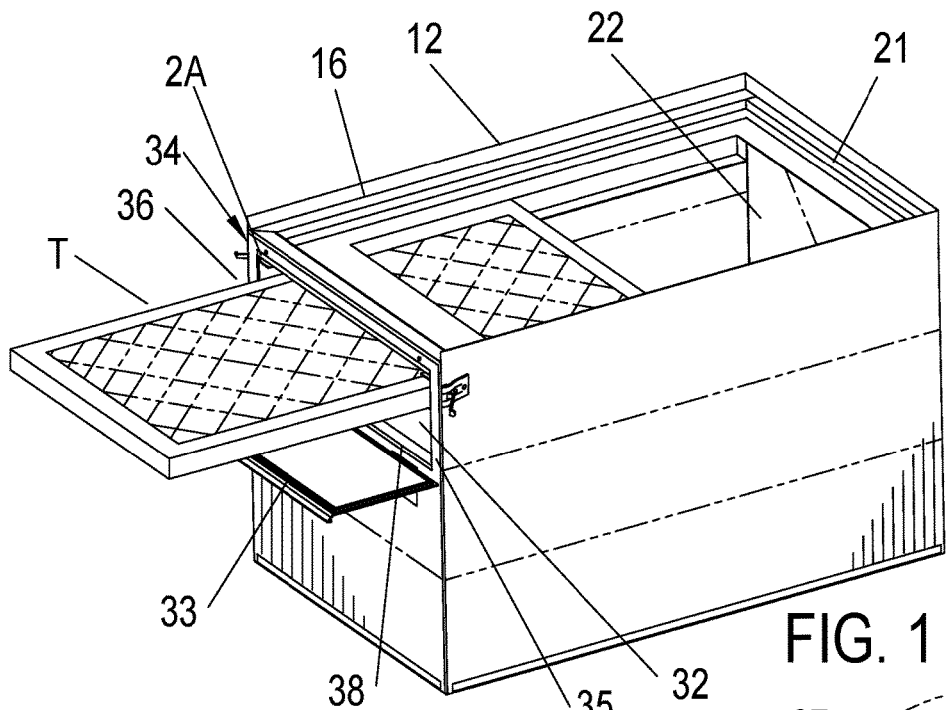
FIG. 1 is a front perspective view of a filter cabinet.

A form of filter cabinet 12 is illustrated in FIGS. 1-6 and is broadly comprised of elongated rectangular side panels 16 and 18 of corresponding size extending upwardly from a common bottom panel 20 and joined to a square or rectangular end or rear panel 22 which also extends upwardly from the rear edge of the bottom panel 20. The side panels 16 and 18 are of elongated rectangular configuration and of a corresponding size extending upwardly from the bottom panel 20 and are joined to the rectangular rear panel 22 which extends upwardly from the bottom panel 20. The rear panel 22 corresponds in height to that of the side panels 16 and 18 and is joined along its abutting edges or corners with the side panels 16 and 18 by suitable snap or button locks along the corners, not shown. In this regard, the 70 vertical panels 16, 18, 20 and 22 may be joined together by well-known nesting seam construction or welding techniques.

The upper edge of the cabinet 12 is dimensioned to conform to the size and configuration of the bottom of a furnace so that the furnace can be firmly seated inside of the retaining wall 16 which projects upwardly from the upper side and rear panels of the cabinet 12. It is important to note that the cabinet 12 may also be situated along a side opening on the furnace (not shown) instead of beneath a furnace and perform in the same manner as described herein.

The vertical panels terminate in upper flat ends 21 of the panels 16, 18 and 22 to assure a firm seated engagement with the furnace. The upper flat ends 21 provide reinforcement and prevent collapse of the filter box by virtue of the weight of the furnace and wherein upper edges of the side panels and end panels have inwardly directed support surfaces for the furnace. The rear panel 22 is of the same height as the side panels 16 and 18 and is joined together along its abutting edges or corners with the side panel as well as the bottom panel.

Figure 5:
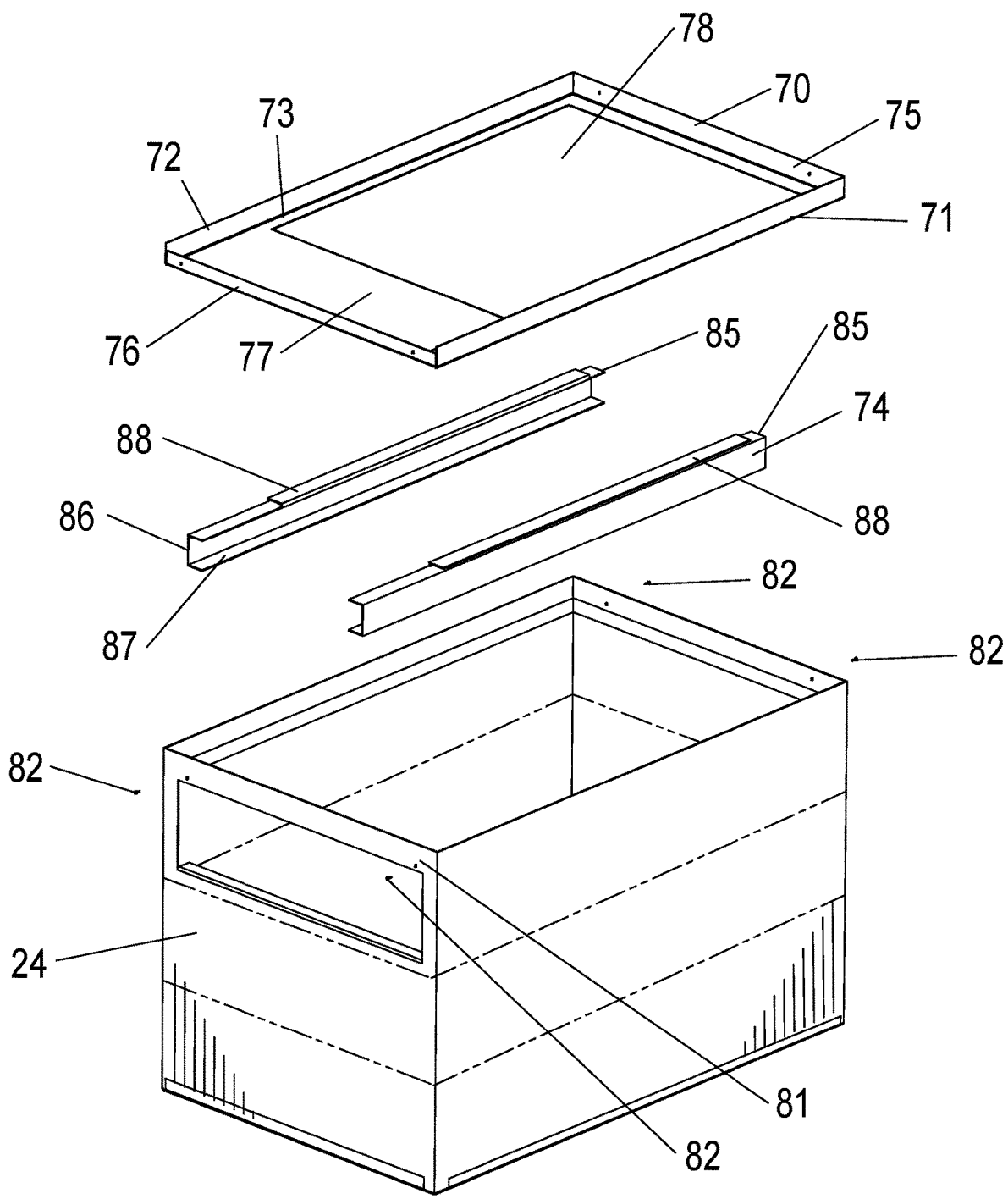
FIG. 5 is an exploded view of the frame assembly of FIG. 1.

A frame insert or brace 70, as shown in FIG. 5, is made up of sheet metal with two frame side panels 71, 72 and two frame end panels 75, 76 forming a rectangular insert. The frame side panels 71, 72 and frame end panels 75, 76 form a cut-away base member 73 with a rectangular opening 78. The end panel 76 includes extension base or member 77 that extends outwardly in a horizontal plane from the end panel 76, providing a guide for the filter insertion and a partial seal for the filter T with the frame 70. The extension base 77 is in touching relation to an upper surface of the filter T upon insertion, as shown in FIG. 1.

Figure 6:
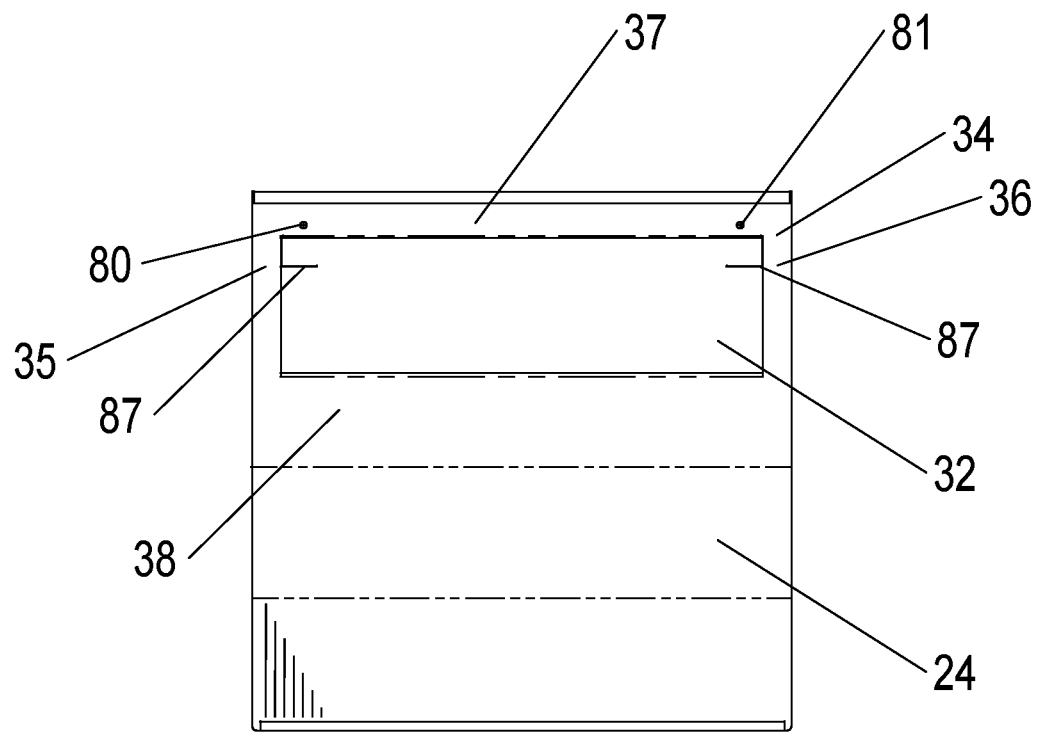
FIG. 6 is a front view of the form shown in FIG. 4.

Once the side and end panels 16, 18, 22 and 24 are joined as set forth above, the frame insert 70 may be inserted internally from the open bottom end of box structure 12, prior to securing of the bottom panel 20. The frame insert end panels 75 and 76 are secured to an upper portion of the end panel 22 and an upper end of the front panel 24 at 80 and 81 as shown in FIG. 5 and FIG. 6 with rivets or screws 82. The insert 70 provides stability to the upper portion of the filter box preserving the integrity of the upper portion so that it does not buckle or misalign when the box is connected to the furnace. Further, the two frame side panels 71 and 72 each have a shelf member 73 that extends horizontally for mounting of the guideways 74 as shown in FIGS. 4A and 4B.

The guideways 74, shown in FIG. 5 may be mounted on opposite shelf members 73 extending from the frame side panels 71 and 72. Different sizes of guideways may be used to accommodate different thicknesses of the filters T. A detail of the channel/guideway is illustrated in FIG. 4A and the removable guideways are generally inverted U-shaped channel members extending horizontally along the greater length and preferably the full length, of each frame side panel 71 and 72 and are offset from the upper flat ends 21 to prevent the filter of filter frame T from being pulled into the furnace. The guideways 74 include a horizontal top wall 85, a sidewall 86, a lower filter support 87 as well as a guideway mount or clip 88. A detail of the guideway is shown in FIG. 4A and FIG. 4B as well as FIG. 5 which show the guideways 74 extending vertically from horizontal guideway mount 88, side panel 71 and upper flat end 21 with an upper return portion 57 that extends along the frame side panels and frame end panels. The guideways extend, preferably, almost the entire length of the frame support side panels 71 and 72. The guideway mounts 88 extend a partial length of the frame support side panels 71 and 72, the approximate length of the rectangular opening 78. In this way, the guideways may be mounted on the shelf members 73 once the frame support 70 is installed.

The guideways 74 including the horizontal top wall 85, are formed to bias in tight fitment against a lateral top wall of a filter frame T when pressurized in an upward airflow condition. An enlarged open plenum or spaced portion 46 along a top portion of the filter box provides a 1" approximate air space for improved air flow between the furnace and the filter frame T, thereby creating a spaced portion between the furnace intake opening and the filter rack horizontal top wall as well as the top of filter T and the frame support member 70. The guideways 74 are removable, allowing insertion of larger guideways to accommodate larger filters within the guideways while preserving the spaced portion between the top of filter T and upper flat end 21.

The vertical panels 16, 18, 22 and front panel 24 are engaged with the bottom plate 20 forming upright flanges 23 by means of generally V-shaped clips 8, 9 formed from the bottom plate 20 as shown in FIG. 4C. This method of joinder facilitates a cabinet construction which may be of the knockdown type so that the four upright panels 16, 18, 22 and 24 along with the bottom panel 20 and the frame insert 70 can be sandwiched together for shipping then assembled at the site. The V-shaped clips 9 allow for additional exterior side clearance due to less material required than an S-clip and is more cost effective. Further, the V-shaped clips provide lower offset members along the entire length and width of the base so that the base or bottom plate 20 does not rest on the ground in case of the presence of water.

Figure 2:
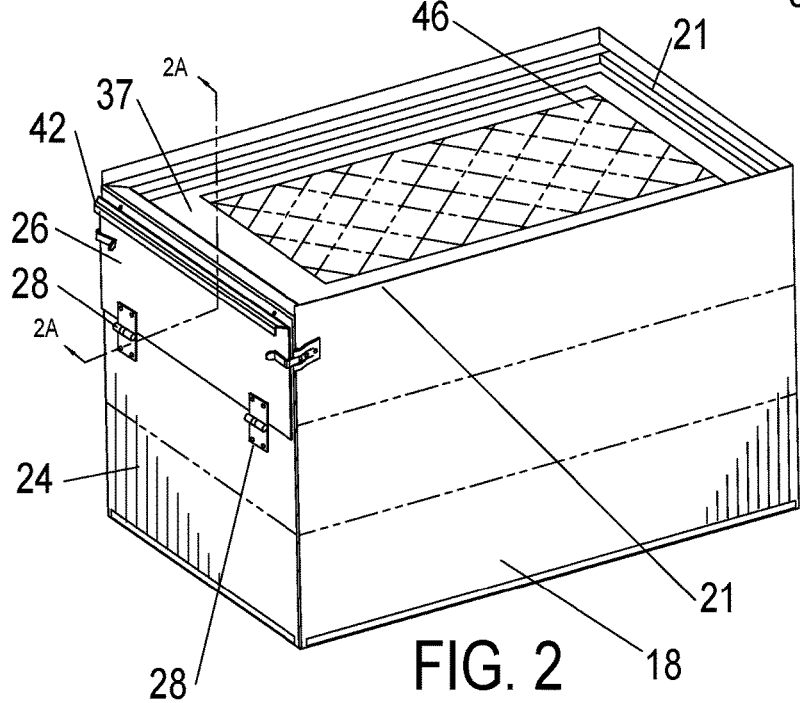
FIG. 2 is a front perspective view of the form shown in FIG. 1 with the door panel in a closed position.

A door panel 26 is connected along its lower edge to the upper edge of the front panel 24 by means of butt hinges 28 which will permit the door panel 26 to pivot downwardly through 180° to rest against the outer surface of the front panel 24. Side clips 29 are released by pivoting into the open position as shown in FIG. 1 from the closed position; as shown in FIG. 2. One form of clip is spring-loaded into the closed position of FIG. 2, such as, a model manufactured and sold by Ludwig Mfg. of Racine, WI. But other forms of clips may be used as well. The door panel 26 is dimensioned to slightly overlap the entrance 32 above the front panel 26, the entrance 32 having an outer rectangular frame 34 with its opening dimensioned for insertion of a standard filter T which may either be of a disposable variety or reusable and require periodic removal for cleaning purposes.

Figure 2A:
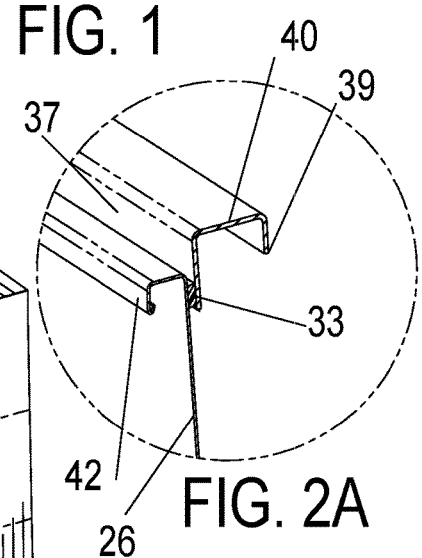
FIG. 2A is a cross-sectional view taken through lines 2A-2A of FIG. 1, illustrating the intersection of the front door panel and the front end of the cabinet frame.

The frame 34 is of sheet metal construction and made up of vertical side frame members 35, 36 and upper and lower horizontal frame members 37 and 38. A detail of the frame members is illustrated in FIG. 2A which shows the upper frame member 37 having a vertical face 40 at the leading edge of the frame 37 with an upper return portion 39. The door panel 26 is mounted and hinged in offset relation to the front panel 24 by 185 means of the hinge members 28 between the lower end of the door panel 26 and front panel 24. The door panel 26 also is of sheet metal construction and terminates in an upper curved return 42 which bends in a direction away from the frame surface 38. The upper return 42 serves the dual purpose of forming a closure along the upper frame member 37 and as a handle which can be grasped with the fingers to open and close the door panel without danger of being pinched or wedged between the door panel 26 and frame 37. A rubber gasket or seal 33 is interposed between the upper edge of the door panel 26 and face 38.

The guideways 74 are offset, preferably 1", from the upper flat ends 21 to prevent the filter T from being pulled into the furnace F and provide approximately and preferably 1" of air space and air flow between the furnace F and the filter T. Since the frame support member 70 is in close fitting relation with the filter T, this means that the frame support member 70 is interposed between the flat ends 21 and the guideways 74. As shown in FIGS. 1 and 2, a standard rectangular furnace filter T is advanced horizontally through the entrance 32 and through the generally inverted U-shaped guideways 74 extending at least a length but preferably the entire length of each side of the frame support 70. The guideways 74 are mounted on the frame insert 70 and are not in touching relationship to the side panels as shown in FIGS. 4A and 4B. The location of the frame support 70 and guideways 74 creates, preferably, a 1" open spacing between a horizontal top wall and a top portion of said filter housing.

In use, return air for the furnace is drawn into the cabinet and continues upwardly through the filter T as illustrated in FIGS. 1 and 2. The upward flow of air through the cabinet will create sufficient vacuum to retain the door panel 26 in a closed position particularly with the cooperation of the hinges 28 and side clips 29. In addition, the guideways 74 extend a substantial length of the frame insert 70, and preferably the entire length of the frame insert and, in cooperation with the extension member 77, serve as a guide for insertion of the filter through the door opening. As noted earlier, the door panel 26 and in particular its upper handle 42 which extends the width of the panel 26 permits the panel 26 to be opened and closed without pinching or cutting one's fingers. In particular, the overall construction of the cabinet with the upper retaining wall 12 in cooperation with the upper flat ends 21 of the panels 16 and 22, defined by inwardly directed support surfaces and the frame support 70 to assure a firm seated engagement with the furnace by virtue of the weight of the furnace. The cabinet dimensions will necessarily vary to accommodate different furnace sizes. Further, it will be apparent that the cabinet construction may be of the knockdown type as hereinafter described in so as to permit assembly at the site.

Although a filter cabinet is herein set forth and described, the above and other modifications and changes may be made as well as their intended application for uses other than described without departing from the spirit and scope of the present apparatus.

We claim:

1. A breakdown furnace filter housing assembly for use as a three-dimensional self-standing structure, comprising:
   a base member, generally rectangular vertical side panels and a pair of opposite, generally rectangular end panels joined to define a generally rectangular housing;
   said base member having upwardly directed flanges;
   wherein said end panels and said side panels are joined in engagement to said upwardly directed flanges;
   a first of said end panels having a doorway and a door panel mounted in said doorway for movement between an open and closed position with respect to said doorway, wherein said first end panel comprises a sheet material comprising an upper frame member, a lower frame member and side frame members connecting the upper and lower frame members wherein the doorway is formed between the upper, lower and side frame members;

a frame brace member secured to each of said end panels, wherein said frame brace member comprises a shelf member;

a pair of removable horizontal guideways mounted to the shelf member with a clip member, wherein the clip member is clipped on to the shelf member such that each of the horizontal guideways extends outwardly from said frame brace member along an interior of said side panels, said guideways each comprising a horizontal top rail and a lower filter frame;

wherein said guideways extend longitudinally in spaced relation to said side panels, thereby forming a gap between said side panels and said frame brace member; and an open plenum between a horizontal top wall and a top portion of said frame brace member.

2. The furnace filter housing assembly according to claim 1 wherein said frame brace member is defined by opposite side and end members, one of said end members having an extension member.

3. The furnace filter housing assembly according to claim 2 wherein said extension member extends outwardly in a horizontal plane from said frame brace end member.

4. The furnace filter housing assembly according to claim 2 wherein said extension member is in touching relation to an upper surface of a furnace filter.

5. The furnace filter housing assembly according to claim 2 wherein said guideways are removably mounted on said frame brace side members.

6. The furnace filter housing assembly according to claim 1 wherein said guideways include mounting members that extend along a length of said guideways.

7. The furnace filter housing assembly according to claim 1 wherein said guideways are offset from top edges of said open plenum and said guideways comprise said horizontal top wall and formed to engage with a lateral top wall of a filter frame when pressurized in an upward airflow condition, and lower filter frame rails adapted for holding the furnace filter frame along bottom surface edges of the filter frame.

8. The furnace filter housing assembly according to claim 1 wherein said guideways may have different sizes.

* * * * *